United States Patent
Anderson et al.

(10) Patent No.: US 7,904,417 B2
(45) Date of Patent: Mar. 8, 2011

(54) RECURSIVE METADATA TEMPLATING

(75) Inventors: Jeffrey R. Anderson, West Fargo, ND (US); Tristan H. Cartony, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 89 days.

(21) Appl. No.: 11/364,279

(22) Filed: Feb. 27, 2006

(65) Prior Publication Data
US 2007/0203934 A1   Aug. 30, 2007

(51) Int. Cl.
  G06F 7/00   (2006.01)
  G06F 17/00  (2006.01)
(52) U.S. Cl. .................................... 707/603; 707/602
(58) Field of Classification Search .......... 707/3, 10, 707/102, 100, 101, 1; 709/224; 715/255; 706/62
See application file for complete search history.

(56) References Cited

U.S. PATENT DOCUMENTS

| | | | | |
|---|---|---|---|---|
| 5,481,718 | A | | 1/1996 | Ryu et al. .......................... 395/700 |
| 5,845,303 | A | * | 12/1998 | Templeman ..................... 715/255 |
| 6,028,605 | A | * | 2/2000 | Conrad et al. ................... 715/840 |
| 6,356,957 | B2 | | 3/2002 | Sanchez, II et al. ............ 709/328 |
| 6,732,331 | B1 | | 5/2004 | Alexander ....................... 715/513 |
| 6,904,454 | B2 | | 6/2005 | Stickler ............................ 709/213 |
| 6,950,828 | B2 | | 9/2005 | Shaw et al. ................. 707/103 R |
| 6,980,980 | B1 | * | 12/2005 | Yeh .................................... 707/2 |
| 6,986,120 | B2 | * | 1/2006 | Reddy et al. .................... 717/104 |
| 7,003,504 | B1 | * | 2/2006 | Angus et al. ....................... 707/1 |
| 7,302,431 | B1 | * | 11/2007 | Apollonsky et al. ............. 707/10 |
| 7,584,194 | B2 | * | 9/2009 | Tuttle et al. ...................... 707/10 |
| 2003/0093434 | A1 | | 5/2003 | Stickler ....................... 707/103 R |
| 2004/0205528 | A1 | | 10/2004 | Alexander ....................... 715/505 |
| 2004/0268231 | A1 | | 12/2004 | Tunning .......................... 715/513 |
| 2005/0065966 | A1 | | 3/2005 | Diab ................................ 707/102 |
| 2005/0091583 | A1 | * | 4/2005 | Goldberg ......................... 715/513 |
| 2005/0262049 | A1 | | 11/2005 | Somppi .............................. 707/3 |
| 2006/0230011 | A1 | * | 10/2006 | Tuttle et al. ....................... 706/62 |

FOREIGN PATENT DOCUMENTS

| WO | WO 02/101579 A1 | 12/2002 |
|---|---|---|
| WO | WO 2005/112270 A1 | 11/2005 |

OTHER PUBLICATIONS

Gaedke et al., M., "WCML: Paving the Way for Reuse in Object-Oriented Web Engineering", Symposium on Applied Computing, Proceedings of the 2000 ACM symposium on Applied computing, vol. 2, Como, Italy, pp. 748-755, 2000.

Kirda et al, E., "My XML: An XML based template engine for the generation of flexible web content", WebNet 2000, pp. 317-322, 2000.

Ceri et al., S., "Web Modeling Language (WebML): a modeling language for designing Web sites", Proceedings of the 9th international World Wide Web conference on Computer networks: the international journal of computer and telecommunications networking, Amsterdam, May 2000.

* cited by examiner

*Primary Examiner* — Susan Y Chen
(74) *Attorney, Agent, or Firm* — Joseph R. Kelly; Westman, Champlin & Kelly, P.A.

(57) ABSTRACT

A computer-implemented method and system are provided for retrieving a metadata instance defining at least part of an application. In the method, a first metadata instance is loaded. Then, one or more templates specified in the first metadata instance are identified. The identified templates are recursively loaded, and metadata from the first metadata instance is applied to the recursively loaded templates to produce a new metadata instance. The new metadata instance is returned.

3 Claims, 5 Drawing Sheets

FIG. 1

```
- 
    - <pageHeader>
        <item1/>
        <item2/>    ⌇~205
        <item3/>
      </pageHeader>
    - <pageBody>
        <item1/>
        <item2/>    ⌇~210
        <item3/>
      </pageBody>
    - <pageFooter>
        <item1/>
        <item2/>    ⌇~215
        <item3/>
      </pageFooter>

```
- 
    - <pageHeader>
        <item1/>
        <item2/>    ⌇~305
        <item3/>
      </pageHeader>

```
-                               ⟵ 400
   - <pageFooter>
        <item1/>        ⟵ 405
        <item3/>
     </pageFooter>

```
-                            ⟵ 500
   - <templates>
        <templates id="Header Template"/>    ⟵ 300
        <templates id="FooterTemplate"/>     ⟵ 400
     </templates>
   - <pageBody>         ⟵ 505
        <item1/>
     </pageBody>
   - <pageFooter>       ⟵ 510
        <item2/>
     </pageFooter>

```
-                                  ⟵ 600
   - <templates>
        <template id="Composition Template"/>   ⟵ 500
     </templates>
   - <pageBody>
        <item2/>        ⟵ 605
        <item3/>
     </pageBody>

RECURSIVE METADATA TEMPLATING

BACKGROUND

When defining metadata information within an application, often many individual pieces of metadata are very similar. For instance, when defining what a data entry page should look like, all metadata definitions of that page may include similar layouts, graphics, titles, etc. Repeatedly defining this information on each individual piece of metadata is not only time consuming, it also leads to maintenance issues if it is found that one of those common pieces will need to change across the entire metadata store.

One standard attempt at solving this problem is to provide a type of inheritance within a metadata store, similar to the inheritance provided by many programming languages. The problem with this approach is that inheritance enforces an "is-a" relationship, where the derived instance "is-a" type of the parent instance. In the case of metadata, this type of hierarchy is often too constraining as it may be desirable to pick and choose multiple characteristics to all be applied to the same metadata instance.

The discussion above is merely provided for general background information and is not intended to be used as an aid in determining the scope of the claimed subject matter.

SUMMARY

Disclosed embodiments introduce the concept of recursive metadata templating. Recursive metadata templating allows a particular metadata piece to specify that it amalgamates a set of templates to build up its basic information, and then extends that amalgam to become a useful piece of metadata. It is recursive in that each template may in turn be composed of multiple templates that are amalgamated and then extended.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As noted, when defining metadata information within an application, often many individual pieces of metadata are very similar. Repeatedly defining this information is time consuming and can lead to maintenance issues if it is found that one of those common pieces will need to change across the entire metadata store. Disclosed embodiments introduce the concept of recursive metadata templating. Recursive metadata templating allows a particular metadata piece to specify that it amalgamates a set of templates to build up its basic information, and then extends that amalgam to become a useful piece of metadata. It is recursive in that each template may in turn be composed of multiple templates that are amalgamated and then extended.

Figure 1:
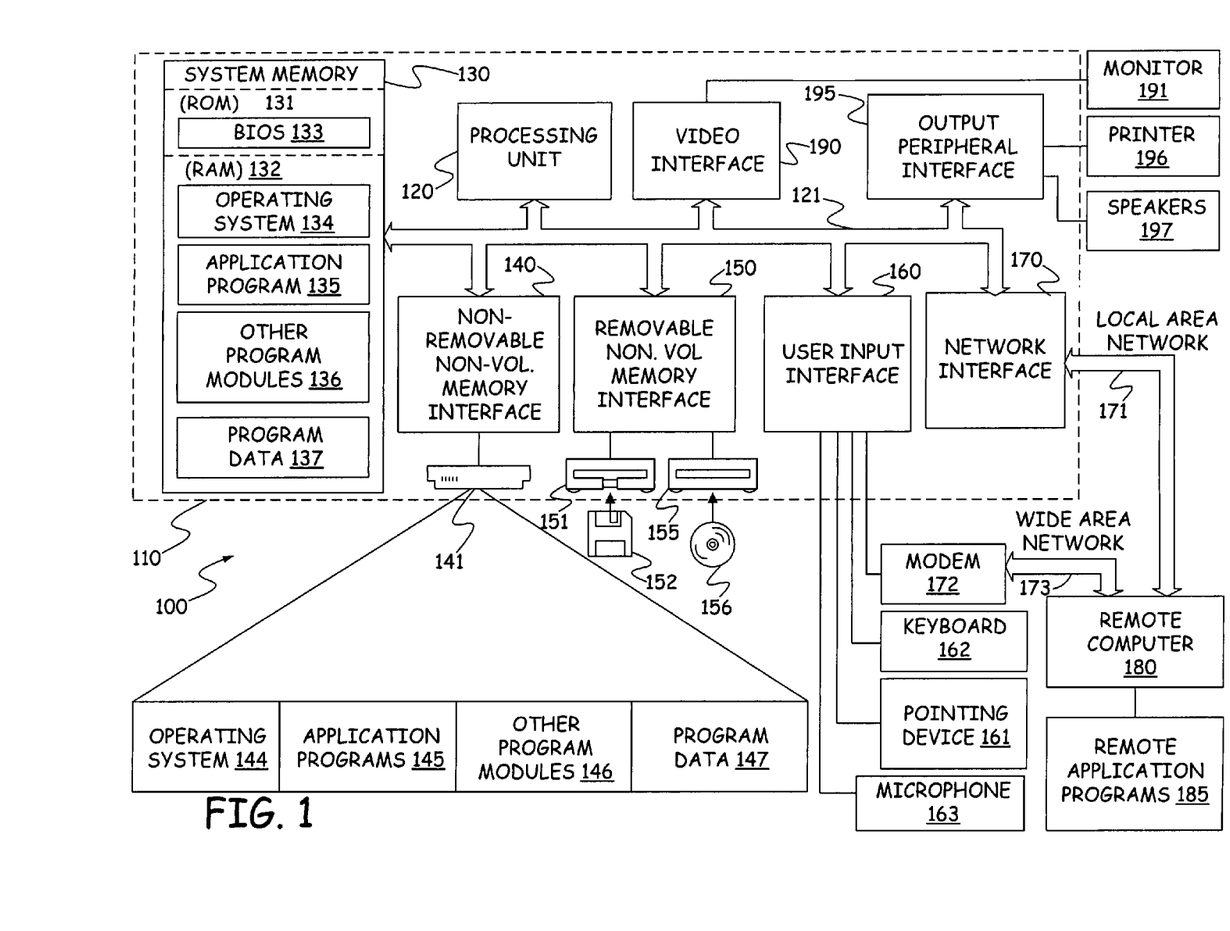
FIG. 1 is a block diagram of a one computing environment in which some embodiments may be practiced.

The disclosed recursive metadata templating methods, apparatus and systems can be embodied in a variety of computing environments, including personal computers, hand held computers, laptop computers, notebook computers, server computers, etc. Any of these computing environments can be used to define metadata information within an application or applications. Before describing the embodiments in greater detail, a discussion of an example computing environment in which the embodiments can be implemented may be useful. FIG. 1 illustrates one such computing environment which can represent any of these different types of computing environments. As such, FIG. 1 should be understood to represent a computing environment configured to implement one or more aspects of the disclosed methods, systems or apparatus.

FIG. 1 illustrates an example of a suitable computing system environment 100 on which one or more aspects of the illustrated embodiments may be implemented. The computing system environment 100 is only one example of a suitable computing environment and is not intended to suggest any limitation as to the scope of use or functionality of the illustrated embodiments. Neither should the computing environment 100 be interpreted as having any dependency or requirement relating to any one or combination of components illustrated in the exemplary operating environment 100.

The illustrated embodiments are operational with numerous other general purpose or special purpose computing system environments or configurations. Examples of well-known computing systems, environments, and/or configurations that may be suitable for use with the illustrated embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The illustrated embodiments may be described in the general context of computer-executable instructions, such as program modules, being executed by a computer. Generally, program modules include routines, programs, objects, components, data structures, etc. that perform particular tasks or implement particular abstract data types. The illustrated embodiments may also be practiced in distributed computing environments where tasks are performed by remote processing devices that are linked through a communication network. In a distributed computing environment, program modules may be located in both local and remote computer storage media including memory storage devices. Tasks performed by the programs and modules are described below and with the aid of figures. Those skilled in the art can implement the description and figures provided herein as processor executable instructions, which can be written on any form of a computer readable medium.

With reference to FIG. 1, an exemplary system includes a general-purpose computing device in the form of a computer 110. Components of computer 110 may include, but are not limited to, a processing unit 120, a system memory 130, and a system bus 121 that couples various system components including the system memory to the processing unit. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Metadata is literally just information about another set of data, so it may take many forms. Some typical embodiments of metadata include XML (extensible markup language), information in a database, attribute-based information, and many others. This disclosure will use XML as an example just for ease of discussion, but those of skill in the art will recognize that the disclosed embodiments can be applied to all other metadata types.

Consider the example of a piece of metadata defined in XML. In disclosed embodiments, the piece of metadata may contain information stating that it uses 0 to n other templates. When the application using the metadata loads the XML, it will first load each of the specified templates, aggregate them together using any desired merging algorithm, and then apply any additional metadata to the aggregate before using that final result. If any of the templates that were loaded recursively defined more templates, those additional templates will be combined to build the requested template.

The manner in which templates are combined to provide a base from which a new metadata instance may be defined is heavily dependent upon the structure of the metadata, and the schema expected by the consuming application. For this reason, techniques for aggregating the templates will differ in each implementation to accommodate specific needs or requirements. The following examples are for reference only and are not intended to limit disclosed recursive metadata templating embodiments to the methods used in these specific examples.

Figure 2:
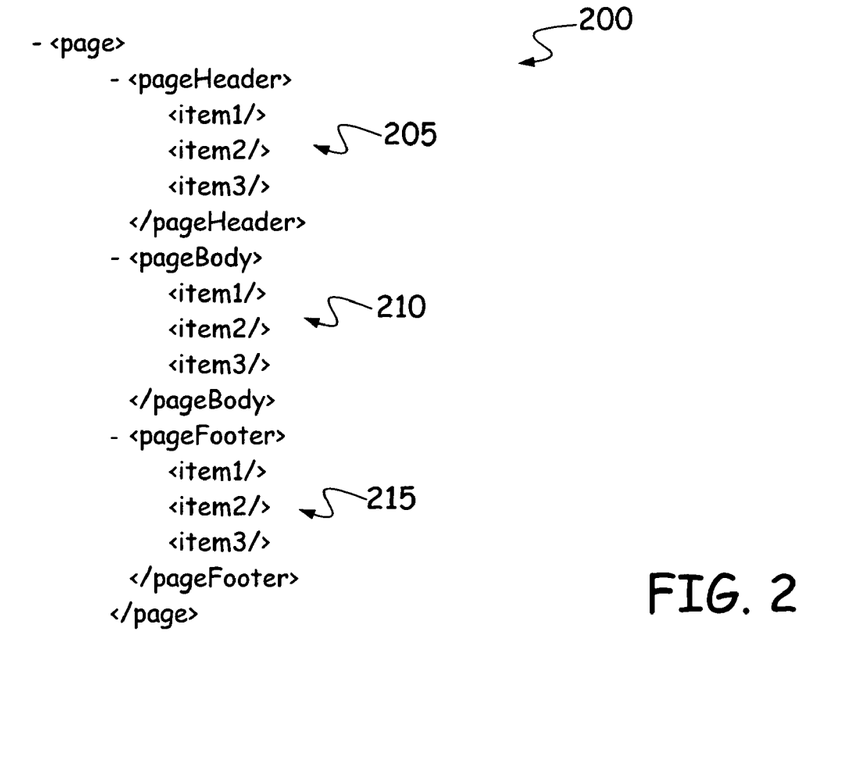
FIG. 2 is an illustration of an example of XML metadata instance.

Referring now to the example shown in FIG. 2, consider an application that expects XML metadata to define pages to be displayed using the syntax designated generally at 200. This metadata includes header information 205 (including fields or data for header item1, header item2 and header item3), body information 210 (including fields or data for body item1, body item2 and body item3), and footer information 215 (including footer item1, footer item2 and footer item3). If the header and footer information was often the same between different page instances, it would be useful to be able to describe it in terms of templates and only explicitly define what is different between each instance. To build the page represented by the metadata shown in FIG. 2 and described above, it could be defined using the four metadata instances illustrated in FIGS. 3-6.

Figure 3:
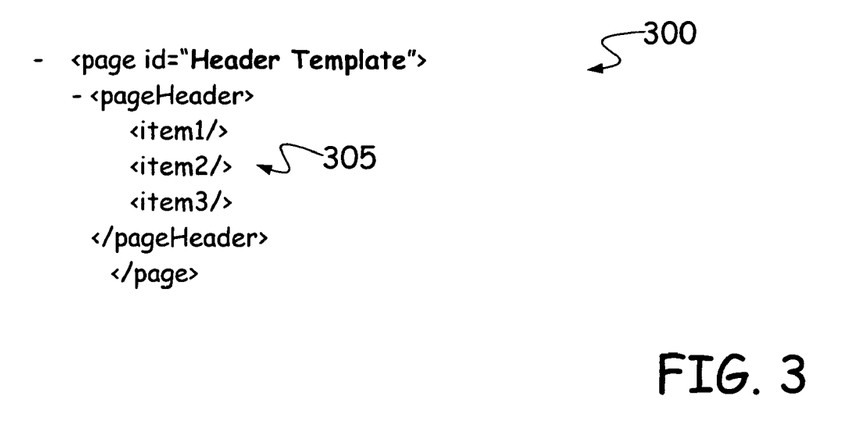
FIGS. 3 through 6 are illustrations of metadata instances which utilize the disclosed recursive metadata templating methods.
Figure 4:
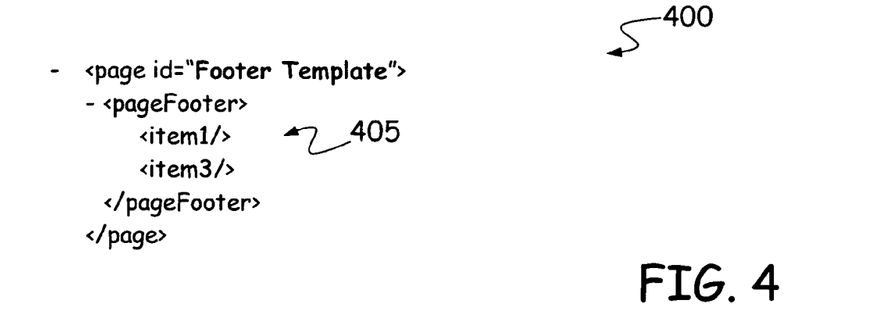

FIG. 3 illustrates a header metadata template 300 including header template information 305, again in the form of fields or data for header item1, header item2 and header item3. FIG. 4 illustrates a footer metadata template 400 including footer template information 405. For purposes of illustrating other aspects of the recursive metadata templating methods, in FIG. 4 the footer template information 405 of footer template 400 includes only footer item1 and footer item3, but not footer item2.

Figure 5:
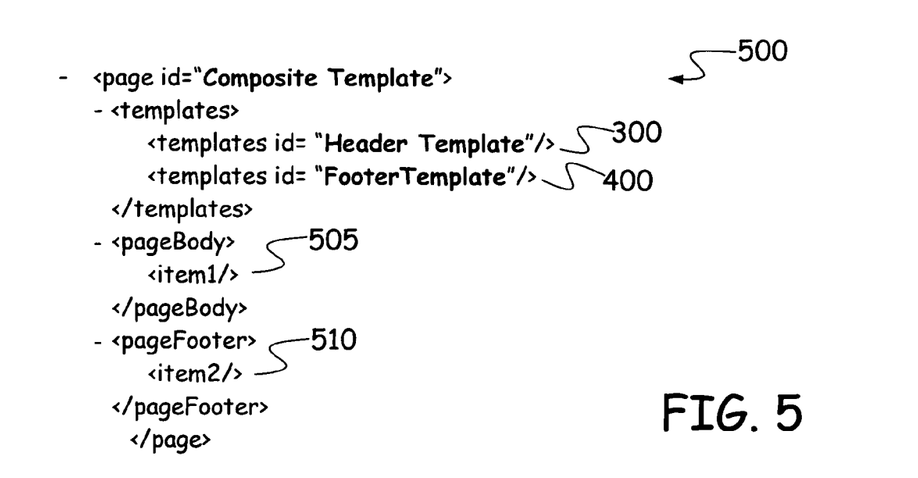

FIG. 5 illustrates a composite template which calls out the header and footer templates 300 and 400 shown in FIGS. 3 and 4. Composite template 500 also has body information 505 (including body item1) and footer information 510 (including footer item2). Note that since composite template 500 references footer template 400 (including footer item1 and footer item3) and footer information 510 (including footer item2), the aggregation provided by composite template 500 will include footer item1, footer item2 and footer item3 as was the case in the metadata 200 shown in FIG. 2.

Figure 6:
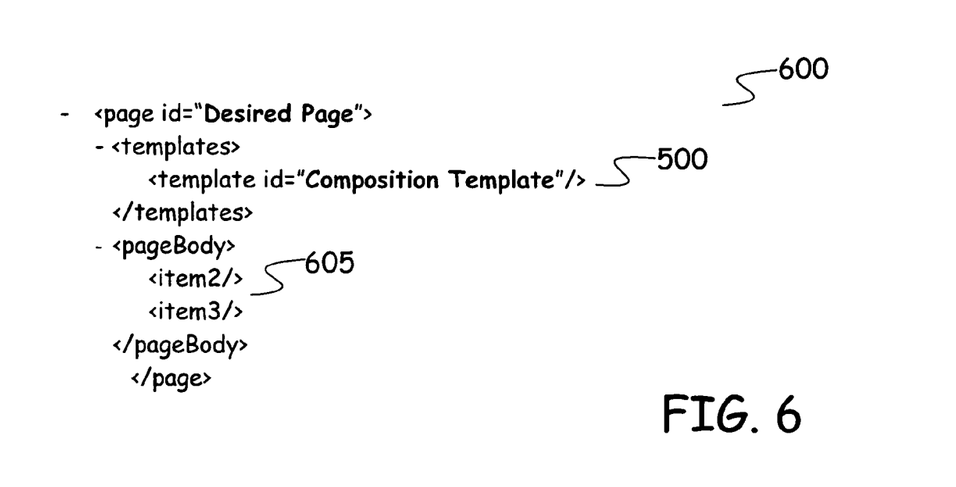

FIG. 6 illustrates desired page metadata definition 600 which uses the recursive templating techniques to build the requisite metadata shown in FIG. 2. As such, desired page metadata definition 600 calls out composite template 500, which will recursively obtain metadata definitions from header template 300 and footer template 400. Desired page metadata definition 600 also includes body information 605 (including body item2 and body item3).

When a consuming application loads "Desired Page" 600, the following processing will occur to apply the recursive metadata templating:
1. Load "Desired Page" 600 (FIG. 6)
2. "Desired Page" has a template of "Composite Template", so load "Composite Template" 500 (FIG. 5).
3. "Composite Template" has templates of "Header Template" 300 (FIG. 3) and "Footer Template" 400 (FIG. 4), so load each of them.
4. Combine the header and footer templates 300 and 400 into a single metadata instance temporarily referred to as X.
5. Add additional items 505 and 510 (FIG. 5) from "Composite Template" to X to create a metadata instance temporarily referred to as Y.
6. Since Y represents the final page that was requested in step #3, it can be combined with the information 605 (FIG. 6) defined in "Desired Page" to create the final metadata instance which is returned to the application.

As an example of a potential benefit of expressing the page by using recursive metadata templating, consider that if during a future release it was found that all occurrences of item1 in the footer of pages needed to be changed, a single instance of metadata would need to be changed rather than potentially hundreds or thousands of instances. This single instance is then automatically changed elsewhere through recursive metadata templating. Further, if a new instance of a page were to be added in, only a very small part of the page would need to be defined, thereby simplifying the creation of the page.

Figure 7:
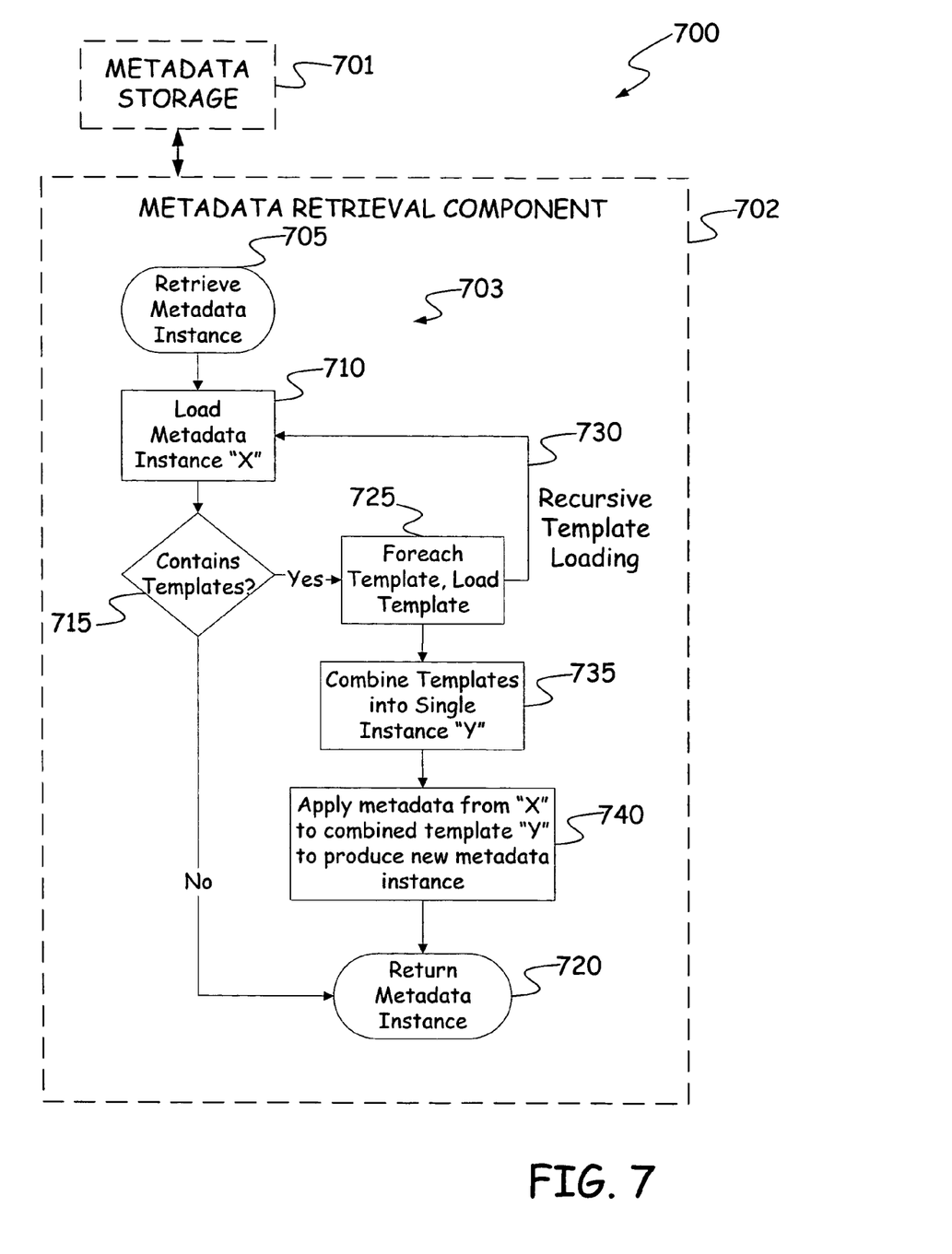
FIG. 7 is a diagram which illustrates a metadata retrieval system and method.
Figure 8:
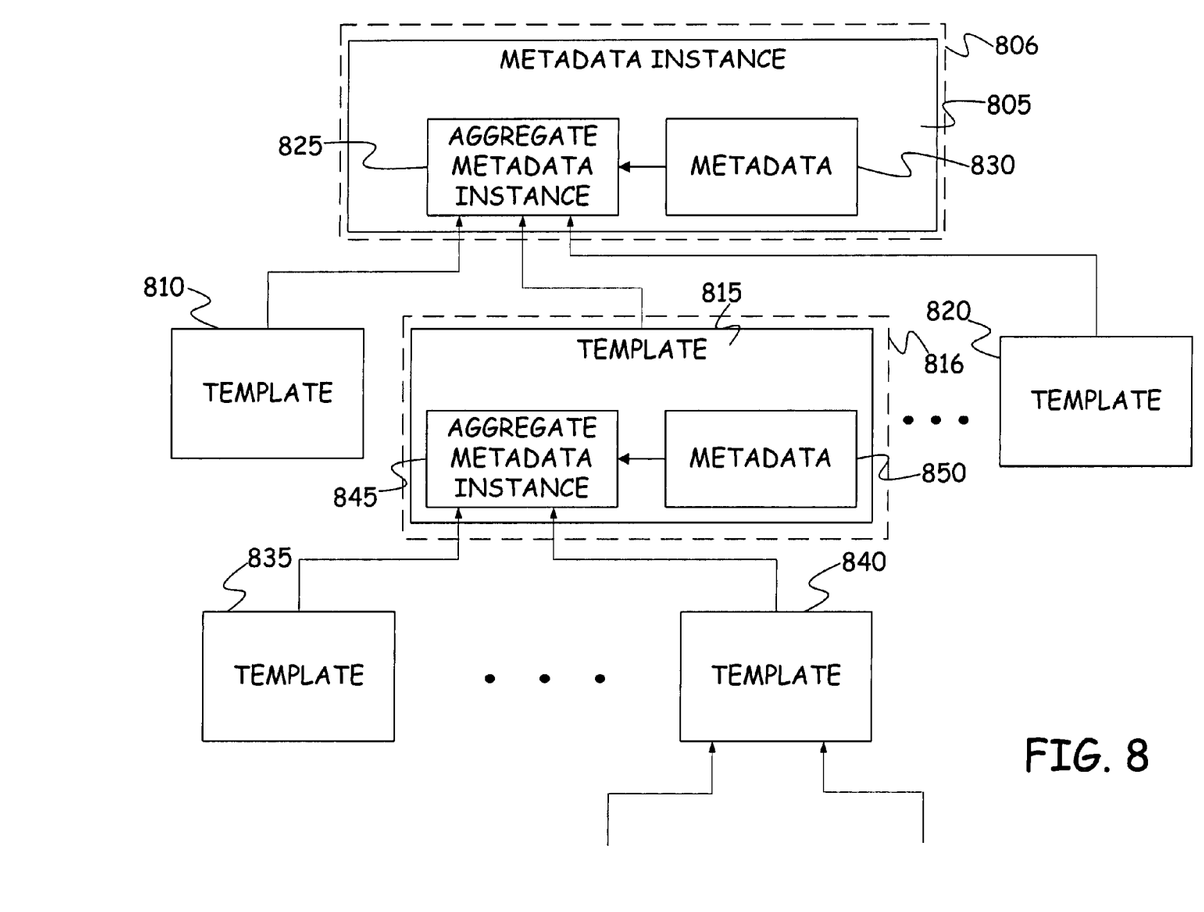
FIG. 8 is a diagrammatic illustration of metadata instances and templates.

FIGS. 7 and 8 further illustrate disclosed recursive metadata templating embodiments. FIG. 7 is a diagram which illustrates a metadata retrieval system 700 having metadata storage 701 containing metadata instances. The metadata instances include metadata templates. System 700 also includes a metadata retrieval component 702 configured to perform metadata retrieval steps which are also shown in FIG. 7. FIG. 8 is a diagrammatic illustration of the metadata recursive templating process which is useful in conjunction with the description of FIG. 7.

As shown in FIG. 7, metadata retrieval component 702 is configured to implement method embodiments for retrieving a metadata instance which defines an application. These method embodiments, represented in FIG. 7 at 703, are described as follows. Upon initiation of a metadata instance retrieval operation as represented at 705 in FIG. 7, at step 710 a first metadata instance (805 in FIG. 8) is loaded. Then, at step 715, zero or more templates (e.g., templates 810, 815 and 820 in FIG. 8), specified in the first metadata instance 805, are identified. Then, as represented at steps 725/730 in FIG. 7, the templates (810, 815 and 820 in this example) specified in the first metadata instance 805 are recursively loaded. To recursively load the templates, at step 725 each template specified in metadata instance 805 is loaded. The algorithm then passes control back to step 710 where it loads a metadata instance for that template. Again at step 715 the algorithm determines whether the template metadata instance itself specified any other templates (for example as template 815 in FIG. 8 is shown to itself specify further templates 835 and 840). This process repeats at each level, with each specified template recursively loaded to include any lower level templates.

After each template contained in metadata instance 805 is recursively loaded, metadata 830 from metadata instance 805 is applied to the loaded templates. This is represented at step 740 in FIG. 7. Typically, before application of metadata 830 to the loaded templates, the loaded templates are combined to create an aggregate metadata instance. This step of combining is represented at 735 in FIG. 7. In FIG. 8, templates 810,

815 and 820 specified in metadata instance 805 aggregate into metadata instance 825. This combination of templates also occurs at lower levels during recursive templating. For instance, in the example shown in FIG. 8, template 815 specifies lower level templates 835 and 840, and upon recursively loading templates 835 and 840, they are combined into aggregate metadata instance 845.

After any aggregation of recursively loaded templates, at step 740 metadata from the corresponding metadata instance is applied to the aggregated metadata instance to produce a new metadata instance. For example, metadata 830 in the first or top level metadata instance 805 shown in FIG. 8 is applied to the aggregate metadata instance 825 corresponding to templates 810, 815 and 820. The new metadata instance for original metadata instance 805 resulting from step 740 is represented in FIG. 8 at reference number 806. This new metadata instance 806 is returned to complete the process at step 720 of FIG. 7. However, step 740 is also performed at lower levels during recursive template loading. For example, in recursively loading template 815, aggregate metadata instance 845 corresponding to templates 835 and 840 has metadata 850 applied, resulting in the new metadata instance represented at 816. This new metadata instance 816 is loaded into metadata instance 805 during the recursive template loading process.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of retrieving an aggregated metadata instance defining at least part of an application, the method comprising:
    (a) loading a changed metadata instance of a first level template, the metadata instance of the first level template specifying next level templates that are to be combined together with the first level template to obtain the metadata instance to be retrieved;
    (b) identifying the next level templates specified in the metadata instance, the next level templates containing fields or data common to a plurality of user interface pages in the application;
    (c) recursively loading the next level templates specified in the metadata instance of the first level template by returning template metadata instances for each of the next level templates;
    (d) combining the returned template metadata instances for each of the recursively loaded next level templates to form an aggregate metadata instance using a processor of the computer;
    (e) applying metadata from the metadata instance of the first level template to the aggregate metadata instance;
    (f) returning the aggregate metadata instance with the metadata from the metadata instance for the first level template such that the changes of metadata in any one of the metadata instances will be populated into each of the further loaded M-data instances such that a change made to the metadata instance is automatically loaded into each one of the loaded metadata templates;
    wherein step (c) of recursively loading the next level templates specified in the metadata instance further comprises for each next level template loading the next level template as a new metadata instance and repeating steps (b) through (e) for the new metadata instance; and
    wherein, for each iteration of steps (c)-(e), applying metadata from the metadata instance of the first level template to the aggregate metadata instance further comprises adding additional changed metadata from the metadata instance of the first level template to metadata in the aggregate metadata instance to obtain the metadata instance to be retrieved, wherein the recursive loading ends when the template identification step fails.

2. A computer storage media having computer-executable instructions for implementing a method of retrieving an aggregated metadata instance defining at least part of an application, the method comprising:
    (a) loading a changed metadata instance of a first level template, the metadata instance of the first level template specifying next level templates that are to be combined together with the first level template to obtain the metadata instance to be retrieved;
    (b) identifying the next level templates specified in the metadata instance, the next level templates containing fields or data common to a plurality of user interface pages in the application;
    (c) recursively loading the next level templates specified in the metadata instance of the first level template by returning template metadata instances for each of the next level templates;
    (d) combining the returned template metadata instances for each of the recursively loaded next level templates to form an aggregate metadata instance using a processor of the computer;
    (e) applying metadata from the metadata instance of the first level template to the aggregate metadata instance;
    (f) returning the aggregate metadata instance with the metadata from the metadata instance for the first level template such that the changes of metadata in any one of the metadata instances will be populated into each of the further loaded metadata instances such that a change made to the metadata instance is automatically loaded into each one of the loaded metadata templates;
    wherein step (c) of recursively loading the next level templates specified in the metadata instance further comprises for each next level template loading the next level template as a new metadata instance and repeating steps (b) through (e) for the new metadata instance; and
    wherein, for each iteration of steps (c)-(e), applying metadata from the metadata instance of the first level template to the aggregate metadata instance further comprises adding additional changed metadata from the metadata instance of the first level template to metadata in the aggregate metadata instance to obtain the metadata instance to be retrieved, wherein the recursive loading ends when the template identification step fails.

3. A metadata retrieval system comprising:
    a computer storage media having stored thereon metadata instances, a plurality of the metadata instances corresponds to metadata templates containing fields or data common to a plurality of user interface pages of an application;
    a processor configured to implement a metadata retrieval component to perform aggregate metadata retrieval steps comprising:
    loading a first changed metadata instance from the computer storage media;
    identifying first and second templates specified in the first metadata instance, the first and second templates each containing fields or data common to a plurality of pages;
    recursively loading from the metadata storage the first and second templates specified in the first metadata instance by loading first and second metadata template instances corresponding to the first and second templates, wherein the first recursively loaded template specifying a next template to be recursively loaded with the first template, wherein recursively loading the next template comprises:

loading a next template metadata instance corresponding to the third next template;

identifying any further templates specified in the next template metadata instance;

recursively loading any identified further templates specified in the next template metadata instance by loading further template metadata instances;

combining the previous recursively loaded further metadata instance with the next template, to obtain an aggregated metadata instance, by applying metadata from the previous loaded metadata instance to any next recursively loaded further templates; and returning the aggregated template metadata instance such that the changes of metadata in any one of the template metadata instances will be populated into each of the further loaded template metadata instances such that a change made to the template metadata instance is automatically loaded into each one of the loaded metadata templates;

wherein the recursive loading ends when the template identification step ends.

* * * * *